United States Patent [19]

Badovinatz et al.

[11] Patent Number: 5,790,788

[45] Date of Patent: Aug. 4, 1998

[54] MANAGING GROUP EVENTS BY A NAME SERVER FOR A GROUP OF PROCESSORS IN A DISTRIBUTED COMPUTING ENVIRONMENT

[75] Inventors: Peter Richard Badovinatz, Kingston; Tushar Deepak Chandra, Elmsford; Orvalle Theodore Kirby, Pleasant Valley; John Arthur Pershing, Jr., Buchanan, all of N.Y.

[73] Assignee: International Business Machines Corporation, Armonk, N.Y.

[21] Appl. No.: 684,246

[22] Filed: Jul. 23, 1996

[51] Int. Cl.⁶ .................................................. G06F 13/00
[52] U.S. Cl. ......................... 395/200.31; 395/200.35
[58] Field of Search ......................... 395/200.3, 200.31, 395/200.35

[56] References Cited

U.S. PATENT DOCUMENTS

| | | | |
|---|---|---|---|
| 4,780,821 | 10/1988 | Crossley | 364/200 |
| 5,179,715 | 1/1993 | Andoh et al. | 395/800 |
| 5,307,495 | 4/1994 | Seino et al. | 395/650 |
| 5,341,477 | 8/1994 | Pitkin et al. | 395/200.03 |
| 5,361,369 | 11/1994 | Kametani | 395/800 |
| 5,404,523 | 4/1995 | DellaFera et al. | 395/650 |
| 5,414,845 | 5/1995 | Behm et al. | 395/650 |
| 5,561,769 | 10/1996 | Kumar et al. | 395/200.05 |
| 5,619,656 | 4/1997 | Graf | 395/200.11 |
| 5,621,892 | 4/1997 | Cook | 395/200.1 |
| 5,649,106 | 7/1997 | Tsujimichi et al. | 395/200.08 |
| 5,652,833 | 7/1997 | Takizawa et al. | 395/182.08 |
| 5,655,081 | 8/1997 | Bonnell et al. | 395/200.32 |

OTHER PUBLICATIONS

"a yelloy pages service for a local area network", Larry L. Peterson, 1988, computer communication review ACM press.

*Primary Examiner*—Richard L. Ellis
*Assistant Examiner*—Saleh Najjar
*Attorney, Agent, or Firm*—Floyd A. Gonzalez

[57] ABSTRACT

Managing group events by a name server for a group of processors in a distributed computing environment by receiving a message by said name server from one of the nodes requesting an event, determining what event is being requested by the message, determining which group the event is for, and storing an identification of the requesting node in an interested party set for the group. The name server determines if the group has a group leader, and if the group does not have a group leader, stores the event to be performed responsive to the message in a lookup queue to be processed when a group leader has been established. The first node requesting an event for a group is established by the name server as the group leader. The state of the group may have a first state wherein no group is established, a second state wherein the group is established but has no group leader, or a third state wherein the group is established and the group has a group leader. The state of the group may be determined by the number of node identifications in the interested party set.

15 Claims, 5 Drawing Sheets

| EVENT | NO GROUP STATE 0 | GROUP, NO GL STATE 1 | GROUP, GL STATE 2 |
|---|---|---|---|
| 401 — LOOKUP: NODE NOT IN IPS | CREATE GROUP, REQUESTOR TO RESPOND GROUP TO ST1 | QUEUE REQUEST | TELL REQUESTOR WHO GL IS, ADD TO IPS. |
| 402 — LOOKUP: NODE IN IPS | — | REMOVE REQUESTOR FROM IPS, QUEUE REQUEST | TELL REQUESTOR WHO IS GL. |
| 404 — DELETE: NODE IS IN IPS | — | REMOVE REQUESTOR FROM IPS. IF LAST ENTRY, GOTO ST0. | REMOVE REQUESTOR FROM IPS. IF LAST ENTRY, GOTO ST0. OR IF THIS GL GOTO ST1. |
| 405 — DELETE: NODE IS NOT IN IPS | LOG ERROR | LOG ERROR | LOG ERROR |
| 407 — UPDATE: NODE IS NOT GL MUST INCLUDE GROUP SEQ. NO. | LOG ERROR | IF NEW SEQ. NO., RECORD NODE AS GL, GOTO ST2. IF OLD SEQ. NO. LOG ERROR. | IF NEW SEQ. NO., RECORD NODE AS GL. IF OLD SEQ. NO., LOG ERROR. |
| 408 — UPDATE: NODE IS GL MUST INCLUDE GROUP SEQ. NO. | LOG ERROR | — | IF NEW SEQ. NO., KEEP NODE AS GL. IF OLD SEQ. NO., LOG ERROR. |
| 410 — FAILURE DETECTED | — | REMOVE FAILED NODE FROM ALL ENTRIES OF IPS AND QUEUE. IF LAST ENTRY, GOTO ST0. | REMOVE FAILED NODE FROM ALL ENTRIES OF IPS AND QUEUE. IF LAST ENTRY, GOTO ST1. |

FIG.4

MANAGING GROUP EVENTS BY A NAME SERVER FOR A GROUP OF PROCESSORS IN A DISTRIBUTED COMPUTING ENVIRONMENT

The present invention relates to distributed computing environments, and more particularly to managing group events by a name server for a group of one or more processors of the distributed computing environment.

BACKGROUND OF THE INVENTION

In a distributed computing environment, the computer contains a plurality of computer nodes which process data in parallel. In many such systems, the nodes may be organized into partitions, with each partition having one or more domains. The nodes in each domain are organized in groups. A node may be in only one domain but may be in more than one group, with the nodes being added or removed from a group, as desired.

Since the processors in a distributed computing environment are running in parallel, it is possible for more than one node to wish to be added, deleted or look up data in the same group at one time. It is important to be able to hold the requests from nodes that arrive while the group is busy with a previous request, without the later requests being lost or without requiring that the requests be sent a second time.

SUMMARY OF THE INVENTION

In the present invention, group events are managed by a name server for a group of processors in a distributed computing environment. The name server receives a message from one of the nodes requesting an event. The name server then determines what event is being requested by the message, determines which group the event is for, and stores an identification of the requesting node in an interested party set for the group. The name server determines if the group has a group leader, and if the group does not have a group leader, stores the event to be performed responsive to the message in a lookup queue to be processed when a group leader has been established. The first node requesting an event for a group is established by the name server as the group leader. The state of the group may have a first state wherein no group is established, a second state wherein the group is established but has no group leader, or a third state wherein the group is established and the group has a group leader. The state of the group may be determined by the number of node identifications in the interested party set and the status of the group leader.

It is therefor a primary object of the present invention to provide an interested party set for each group of processors for storing the identification of nodes sending messages for the group.

It is another object of the present invention to determine the state of the group by determining the number of node identifications stored in the interested party set and the status of the group leader.

It is another object of the present invention to provide a lookup queue for storing messages which arrive for a group for which no group leader has yet been established, and to process the messages in the lookup queue when a group leader has been established.

It is another object of the invention to provide a table having multiple entries, each entry for a group of processors wherein a group is identified by the index number of its entry in the table.

It is another object of the present invention to provide an incarnation number in each entry of the table, which incarnation number is incremented each time the group of its entry is dissolved such that the entry by be reused for a new group.

It is another object of the present invention to provide a unique token for the group in the domain, said token being a combination of the group index and the incarnation number.

The foregoing and other objects, features and advantages of the invention will be apparent from the following more particular description of the preferred embodiment of the invention as illustrated in the drawings.

BRIEF DESCRIPTION OF THE DRAWINGS

FIG. 4 is a state diagram showing events and states of groups of processors managed by the table of FIG. 3.

DESCRIPTION OF THE PREFERRED EMBODIMENT

Figure 1:
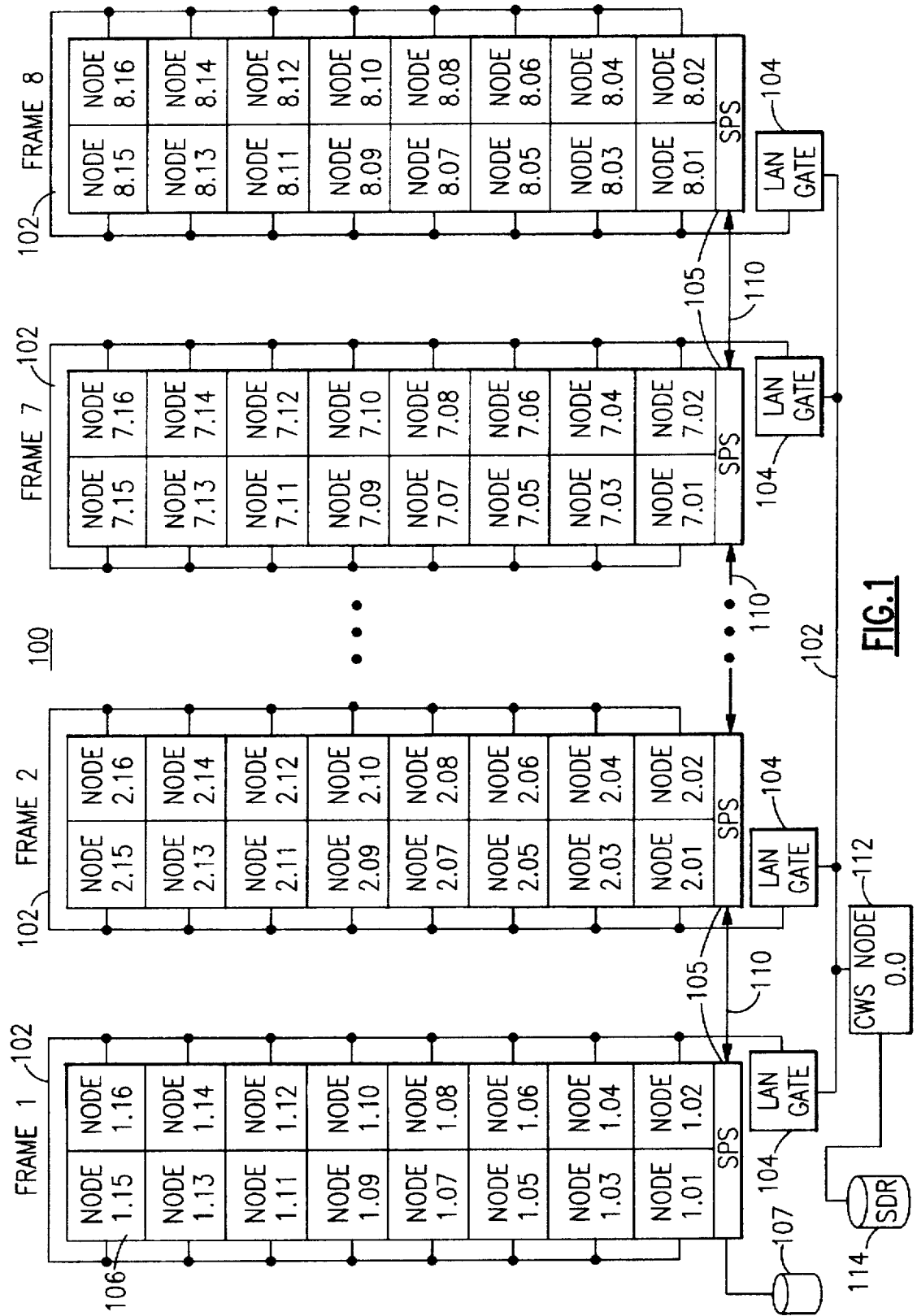
FIG. 1 is a schematic diagram of a distributed computer system of the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, NY. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as a list of nodes that are in the system and their configuration. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As well understood in the art, the CWS node 112 sends system data and control signals to the frames of the SP computer 100 by means of the LAN 102 while messages and data may be sent from one to another of the nodes 106 by means of the high performance switches 105.

Each of the nodes 106 and the CWS 112 of the SP computer system 100 includes a group services daemon, as explained in U.S. patent application Ser. No. 08/640,412 by P. R. Badovinatz et al. for "A Method for Managing Membership of a Group of Processors in a Distributed Computing Environment", assigned to the assignee of the present invention and incorporated herein by reference. Each of the nodes 106 may include software or hardware, or a combination, which reports to all the other nodes those nodes which are up and available for use. If any of the nodes 106 fails, its identity is made known to the other nodes by a process known as a heartbeat function. As is known, the nodes 106 of the SP computer system 100 may be divided into partitions.

Figure 2:
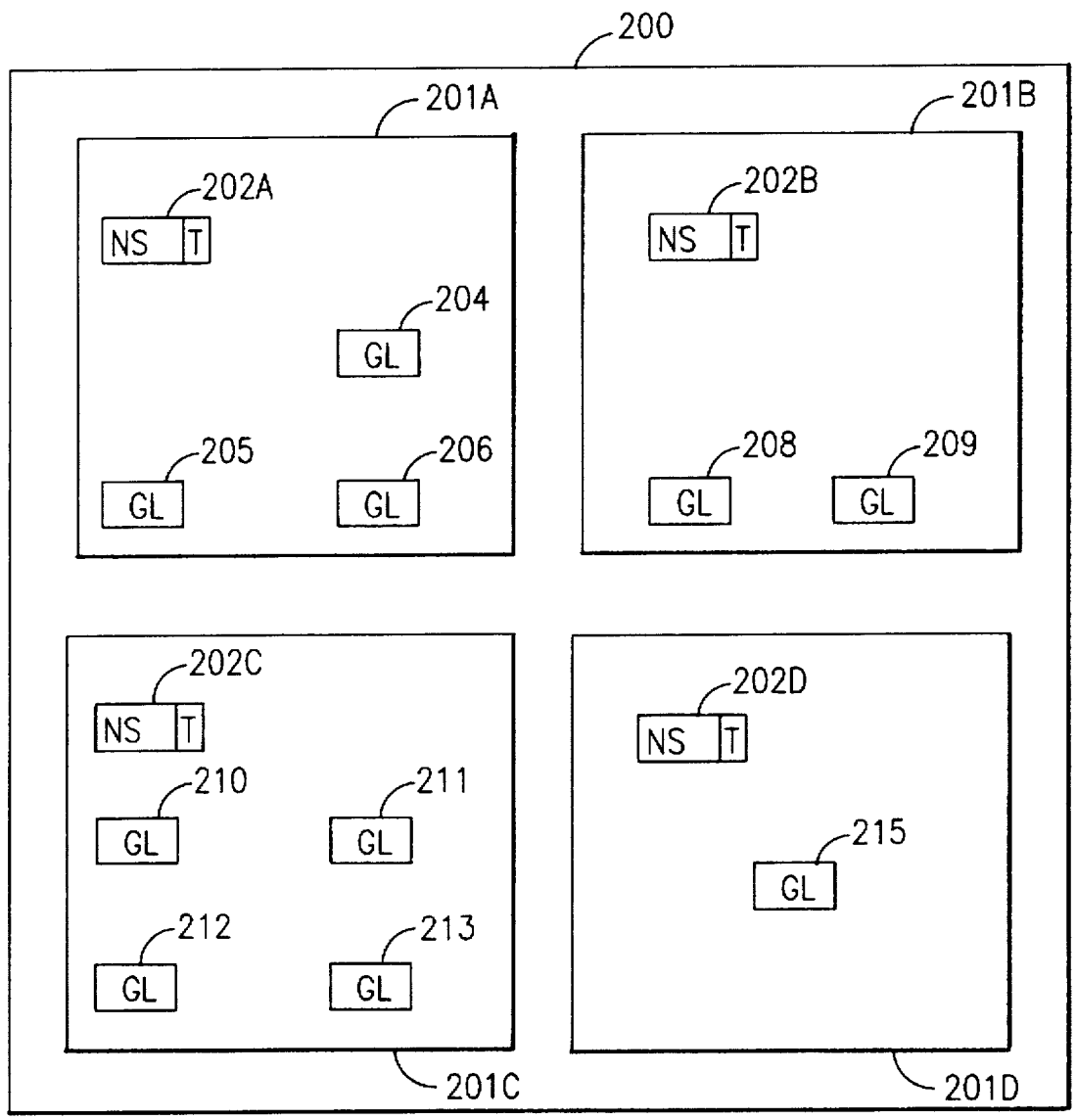
FIG. 2 is a block diagram of domains of processors in the distributed computer system of FIG. 1.

FIG. 2 is a block diagram showing a partition 200 of the nodes 106. The partition 200 may be further subdivided into one or more domains. For example, the partition 200 in FIG. 2 is subdivided into four domains, domains 201A–201D. Each domain 201 includes a name server 202. For instance, the example of FIG. 2, the domains 201A–201D have name servers 202A–202D, respectively. The nodes in a domain 201 may be members of one or more groups, each group served by a group leader. For instance, the nodes in the domain 201A are members of three groups, with each group served by the group leaders 204, 205, and 206. The nodes in the domain B are members of two groups, each group served by the group leaders 208 and 209. Likewise, the nodes of domain 201C are members of four groups, each group served by the group leaders 210, 211, 212, and 213. The nodes in domain 201D are members of a single group, which group is served by group leader 215. The main function of the name server is to direct each node wanting to join a group in the domain to that group's group leader (GL), and to insure that the group names are unique within the domain. The managing of membership of a group of processors, and the function of the group leaders is fully described in the aforementioned U.S. patent application Ser. No. 08/640,412. The information needed to direct a node to the group leader of the group the node wishes to join is kept in a table T maintained by each name server for the groups in its domain.

Figure 3:
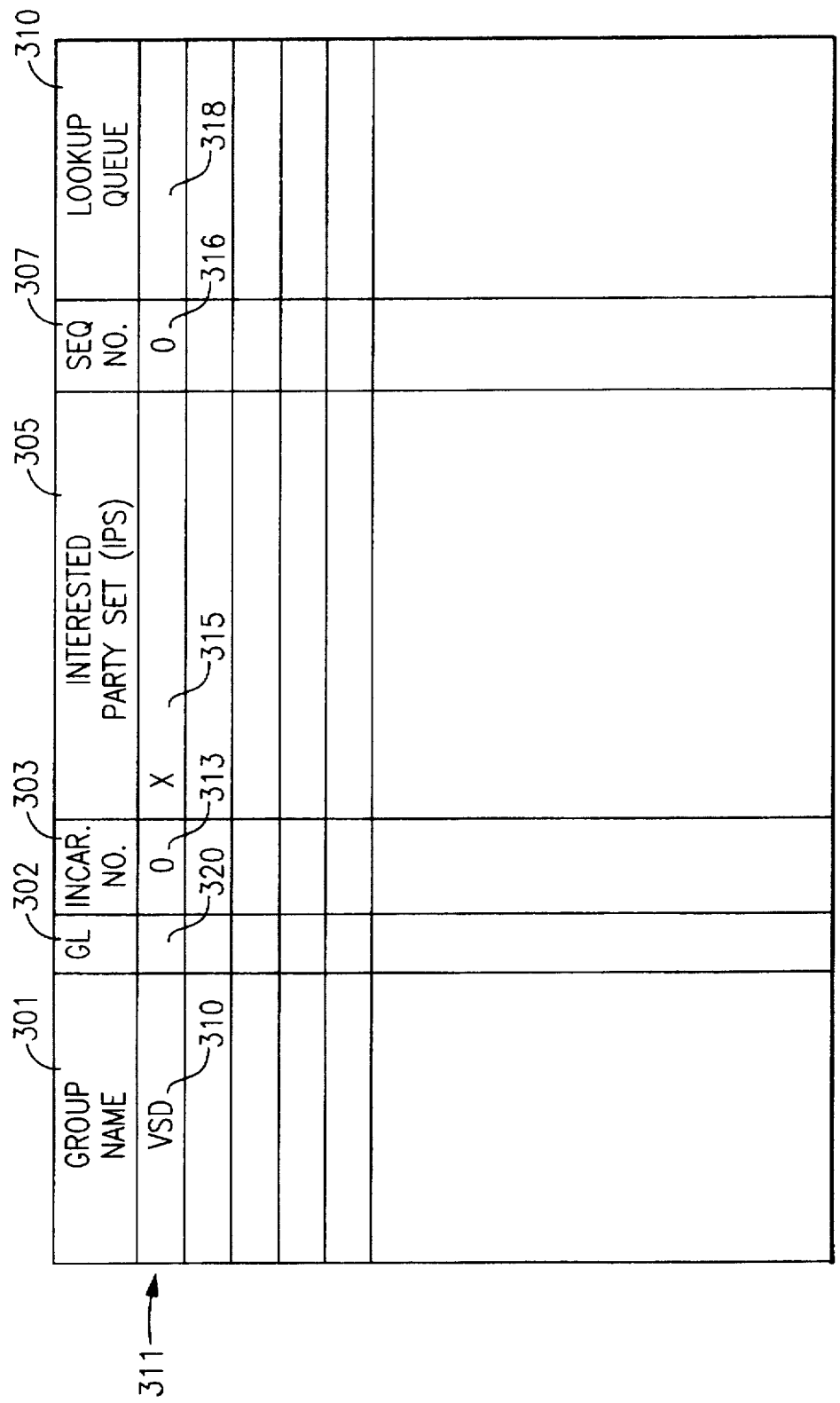
FIG. 3 is a diagram showing a table of a name server for managing groups of processors on a domain of FIG. 2.

FIG. 3 is a diagram of a table 300 used by the name server to manage events in a group of processors in a domain. The table 300 is the same as table T for each of the name servers of FIG. 2. The table 300 includes multiple entries, each entry representing a group of processors. The table T includes a column 301 for the group name which is a unique name used to identify the group, a column 302 for an identification of the group leader (GL) of the group, and an incarnation number 303 for the group. As will be explained, if all members of a group fail or are otherwise removed from a group, the entry may be reused when another group is established. This reuse is provided by increasing or bumping up the incarnation number 303. If a event for the old group is issued, the event will include the old incarnation number, and be ignored by the name server such that the table entry for a new group will not be altered as a result of an event meant for a group which no longer exists.

The table 300 also includes a interested party set (IPS) column 305, which is used to list identifications of all nodes which have an interest in the group. This is similar to showing all of the nodes which are members of the group. Included is a sequence number column 307 which contains the sequence number of valid update messages such that the name server may determine if messages it receives are current. Finally, the table 300 includes a lookup queue column 310 in which is stored an identification of all lookup events which have been received for the group, but which cannot be processed at the present time, as will be explained.

It will be understood that the index number of the entry in the table 300 may be used as part of a token to identify the group for which an event is meant.

An example for the use of the table 300 will now be explained. If, for instance, a node X wishes to form a group to use a facility such as Virtual Shared Disk (VSD), which is a product available from IBM, the node which wishes to use VSD will send a message to the name server requesting the node to join the VSD group. Since this is the first request for that group, the name server will establish a new group, and may name the group VSD, which will be placed in the group name field 301 for the first entry 311, as shown at 312. The token for the VSD group will include "1" to indicate that the VSD group is found in the first entry of the table 300.

Since there is no group leader at the present moment, the GL field will be left with no entry. However, establishing an entry in the table 300 establishes the VSD group. The incarnation number at 313 will be set to 0, indicating that this is the first group to use the first entry. The incarnation number at 315 will also become part of the token to identify the VSD group. The sequence number at 316 will be set to 0 to identify the correct sequence number of any message sent to the group to make sure that stale messages will not be processed. At this point, the name server will send a Lookup Response message to node X telling node X that it is the group leader, since node X is the first node to request that group. Node X, however, will not be installed as VSD GL in table 300 until node X sends an update message with a valid sequence number to the name server asserting that it is the group leader. In the mean time, any lookup messages received by the name server for the VSD group will be stored in the lookup queue field 318 for the VSD group until the group leader is assigned. Thus, any lookup events which are received for the VSD group before there is a node identification in the GL field 320 will be stored in the lookup queue 318 for later processing, as will be discussed.

When an update message is received from node X asserting that it is the group leader for the VSD group, X will be added to the GL field 320. Any lookup messages which have been stored in the lookup queue 318 will now be processed.

FIG. 4 is a state table showing events that can be received by the name server, the states that a group may be in, and the proper actions that must be taken to properly manage the groups by the name server. Each group may have "State 0" (ST0) wherein there is no group established, "STATE 1" (ST1) wherein the group is established with no group leader, or "STATE 2" (ST2) wherein the group is established and has a group leader assigned.

Each event is started by the receipt of a message by the name server making certain requests, as indicated in the event column of the table of FIG. 4.

Event 401 is a lookup from a node for a group (such as VSD) wherein the node is not in the IPS. If the group for event 401 is in STATE 0, the group is created and the requester is sent the Lookup Response message, and the state for that group moves to STATE 1. If the group is in STATE 1 for event 401, the request is queued in the lookup queue; when the group moves to STATE 0 or STATE 2 the messages in the lookup queue are processed and the results sent. If the group is in STATE 2 for event 410, a Lookup Response message is sent to the requester telling the requester who the group leader is. For all group states, the requester's identification is stored in the IPS as an interested party.

The event at 402 is a lookup for a group wherein the requesting node is in the IPS. There is no entry for event at STATE 0 since this is a state that can't happen. If the group is in STATE 1 for event 402, the requester is removed from the IPS; the request is stored in the lookup queue; when the state moves to STATE 0 or STATE 2, the messages in the lookup queue are processed and the results sent. When the group is in STATE 2 for event 402, the requesting node is told who the group leader is.

The event at 404 is a delete wherein the node is in the IPS. If the group is in STATE 1 for event 404, the requestor is removed from the IPS, and if this is the last entry in the IPS, the group is moved to STATE 0 and there is no longer a group leader for this group. The group is thus destroyed and the entry may be reused, as previously discussed. If the group is in STATE 2 for event 404, the requestor is removed from the IPS; and if this is the last entry, the group goes to STATE 0; or if the requestor is the group leader, the group goes to STATE 1.

The event at 405 is to delete the node from the group, and the node is not in the IPS. In this event, an error is logged if the group is in any of the states STATE 0, STATE 1 or STATE 2. This event may have occurred when a node sent the message and then failed, and the name server saw the failure and removed the 25 node from the group before the event was processed.

The event at 407 is an update wherein the node is not the group leader. The message for this event must include the correct group sequence number to be processed by the name server. This message may be generated by the recovery process as a result of the failure of the group leader as explained in U.S. patent Ser. No. 08/640,219 by P. R. Badovinatz et al. for METHOD FOR GROUP LEADER RECOVERY IN A DISTRIBUTED COMPUTING ENVIRONMENT, owned by the assignee of the present invention and incorporated herein by reference. This message may also be the update message in response to the lookup message that created the group, as previously discussed. If the group is in STATE 0 for event 407, an error is logged. If the group is in STATE 1 and the sequence number in the update message is the newer than the saved sequence number, the node is recorded as the group leader, and the group moves to STATE 2. If the sequence number is older, an error is logged. If the group is in STATE 2 for event 407 and the sequence number is newer, the node is recorded as the new group leader. If the message sequence number is older, an error is logged.

The event at 408 is an update wherein the node is already the group leader. The message for this event must include the group sequence number. If the group is in STATE 0 for event 408, an error is logged. There is no entry for STATE 1 for event 408 since this is a state that cannot happen. If the group is in STATE 2 for event 408, and the sequence number is newer than the saved sequence number, the requesting node is kept as the group leader and the sequence number is saved. If the sequence number is older than the saved sequence number, an error is logged. This event may be used to increase the sequence numbers to prevent old sequence numbers from being recognized as good sequence numbers such as, for instance, when the sequence numbers wrap.

The event at 410 is sent when a failure is detected, such as discussed in the aforementioned U.S. patent Ser. No. 08/640,219. If the group is in State 1 for event 410, the failed node is removed from all entries of the IPS and lookup queue. If this is the last entry in the IPS, the state is changed to STATE 0. If the group is in STATE 2, the failed node is removed from all entries of the IPS and the lookup queue. If this is the last entry in the IPS, the state is changed to STATE 0. If this node is the group leader, the state is changed to STATE 1.

Figure 5:
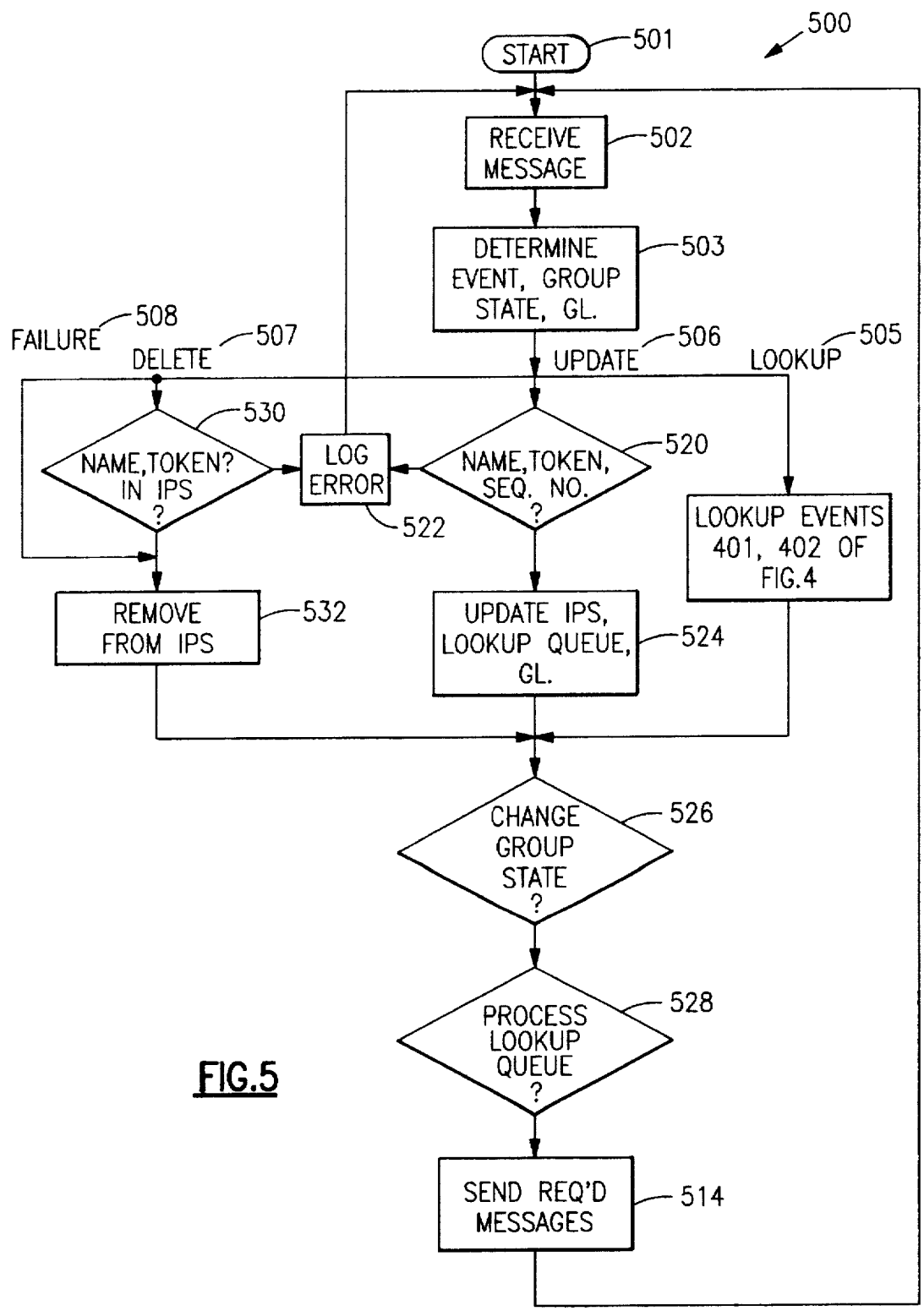
FIG. 5 is a flow chart of a program in the name server of a domain of FIG. 2 for implementing the present invention.

FIG. 5 is a flow chart of a program 500 executed by the name server to implement the present invention. The flow chart of FIG. 5 is a simplified block diagram for ease of illustration. For the exact actions to be taken for each event, reference should be made to the state diagram of FIG. 4 and the accompanying discussion.

The program 500 starts at 501. At 502, the name server receive a message. At 503, the program determines what event is being requested for the group, and determines the group state of the group, and the group leader, if any. The events may be divided into lookup events at 505, update events at 506, delete events at 507, and node failure events at 508.

For lookup events 505, the program performs the processing previously described for events 401 and 402 in FIG. 4. At 528, the program determines if the lookup queue should be processed because of a change in the group state. Finally, any required messages are sent at 514, and the program returns to 502 to receive the next message.

For update events 506, the program checks the name, token and sequence number of the message at 520. If they are not correct, an error is logged at 522, and the program returns to 502 to receive the next message. If the name, token and sequence number are correct, the program at 524 updates the group leader and saved sequence number, as required by the event. The program then goes to 526 wherein the program determines if the group state should be changed. At 528, the program determines if the lookup queue should be processed, as might be required by a change in the group state. At 514, the program sends any messages required by the event, and returns to 502 to receive the next message.

If the event is a delete event 507, the program determines at 530 if the name and token are correct and if the node to be deleted is in the IPS. If the name and token are not correct or if the node to be deleted is not in the IPS, the program logs an error at 522, and returns to 502 to receive the next message. If the name and token are correct, and the node is in the IPS, the program goes to 532 wherein the node is removed from the IPS. The program then goes to 526 wherein a determination is made if the group state should be changed, 528 wherein a determination is made if the lookup queue should be processed, and 514 wherein any messages required by the event are sent.

If the event is a node failure 508, the program goes to 532 wherein the node is removed from the IPS for all groups. The program then goes to 526, 528 and 514, previously discussed, and returns to 502 to receive the next message.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described my invention, what we claim as new, and desire to secure by Letters Patent is:

1. A method for managing group events by a name server for groups of processors, each group of processors for executing related processes in a distributed computing environment, said method comprising the steps of:

receiving a message by said name server from one of said processors requesting an event which affects the membership of one of the groups;

determining what event is being requested by said message;

determining which group the event is for;

storing an identification of the requesting processor in an interested party set for the group;

determining if the group has a group leader;

if the group does not have a group leader, storing the event to be performed responsive to the message in a lookup queue to be processed when a group leader has been established;

establishing as the group leader, the first node to send a message to the name server requesting an event; and processing all events stored in the lookup queue after said group leader is established for said group.

2. The method of claim 1 further comprising the steps of:

providing a table in said name server, said table having multiple entries, wherein each entry represents a group of processors; and identifying each processor group by the index number of the entry in said table for that group.

3. The method of claim 2 further comprising the steps of:

providing an incarnation number in each entry; and incrementing said incarnation number each time the group of the entry is dissolved such that the entry may be reused for a new group of processors.

4. The method of claim 3 comprising the steps of:

providing a sequence number in each entry of said table;

including a new sequence number in messages sent to said name server, said messages identifying a group entry in said table and requesting events for the identified group in said table; and comparing the new sequence number in said messages with the sequence number in said table entry and only performing those events whose new sequence number is higher than the sequence number in the table entry for the group identified in said messages.

5. The method of claim 4 comprising the steps of:

deleting from said interested part set, the identity of the node sending a message requesting an event deleting the node; and determining the state of the group from the entries in said interested party set wherein the states of the group is a first state wherein no group has been established, a second state wherein the group has been established but has no group leader, and a third state wherein said group has been established and has a group leader.

6. An apparatus for managing a group event by a name server for groups of processors, each group of processors for executing related processes in a distributed computing environment, said apparatus comprising:

means for receiving a message by said name server from one of said processors requesting an event which affects the membership of one of the groups;

first determining means for determining what event is being requested by said message;

second determining means for determining which group the event is for;

an interested party set for storing for the group, an identification of the requesting processor of said message;

third determining means for determining if the group has a group leader;

a lookup queue for storing the events if the group does not have a group leader, events stored in said lookup queue to be processed when a group leader has been established;

means for establishing as the group leader, the first node to send a message to the name server requesting an event; and means for processing all events stored in the lookup queue after said group leader is established for said group.

7. The apparatus of claim 6 further comprising:

a table in said name server, said table having multiple entries, wherein each entry represents a group of processors, and each processor group is identified by the index number of the entry in said table for that group.

8. The apparatus of claim 7 further comprising;

an incarnation number in each entry; and means for incrementing said incarnation number each time the group of the entry is dissolved such that the entry may be reused for a new group of processors.

9. The apparatus of claim 8 comprising:

a sequence number in each entry of said table;

a new sequence number in messages sent to said name server, said messages identifying a group entry in said table and requesting events for the identified group in said table; and means for comparing the new sequence number in said messages with the sequence number in said table entry and only performing those events whose new sequence number is higher than the sequence number in the table entry for the group identified in said messages.

10. The apparatus of claim 9 comprising:

means for deleting from said interested part set, the identity of the node sending a message requesting an event deleting the node; and forth determining means for determining the state of the group from the entries in said interested party set wherein the states of the group is a first state wherein no group has been established, a second state wherein the group has been established but has no group leader, and a third state wherein said group has been established and has a group leader.

11. A program product recorded on a computer readable medium, said program product for managing group events by a name server for groups of processors, each group of processors for executing related processes in a distributed computing environment, said program product comprising:

receiving a message by said name server from one of said processors requesting an event which affects the membership of one of the groups;

determining what event is being requested by said message;

determining which group the event is for;

storing an identification of the requesting processor in an interested party set for the group;

determining if the group has a group leader;

if the group does not have a group leader, storing the event to be performed responsive to the message in a lookup queue to be processed when a group leader has been established;

establishing as the group leader, the first node to send a message to the name server requesting an event; and processing all events stored in the lookup queue after said group leader is established for said group.

12. The program product of claim 11 further comprising:

providing a table in said name server, said table having multiple entries, wherein each entry represents a group of processors; and identifying each processor group by the index number of the entry in said table for that group.

13. The program product of claim 12 further comprising:

providing an incarnation number in each entry; and incrementing said incarnation number each time the group of the entry is dissolved such that the entry may be reused for a new group of processors.

14. The program product of claim 13 comprising:

providing a sequence number in each entry of said table;

including a new sequence number in messages sent to said name server, said messages identifying a group entry in said table and requesting events for the identified group in said table; and comparing the new sequence number in said messages with the sequence number in said table entry and only performing those events whose new sequence number is higher than the sequence number in the table entry for the group identified in said messages.

15. The program product of claim 14 comprising:

deleting from said interested part set, the identity of the node sending a message requesting an event deleting the node; and determining the state of the group from the entries in said interested party set wherein the states of the group is a first state wherein no group has been established, a second state wherein the group has been established but has no group leader, and a third state wherein said group has been established and has a group leader.

* * * * *